Feb. 13, 1951 P. MORRISON 2,541,599
RADIOGRAPHY
Filed Oct. 31, 1944
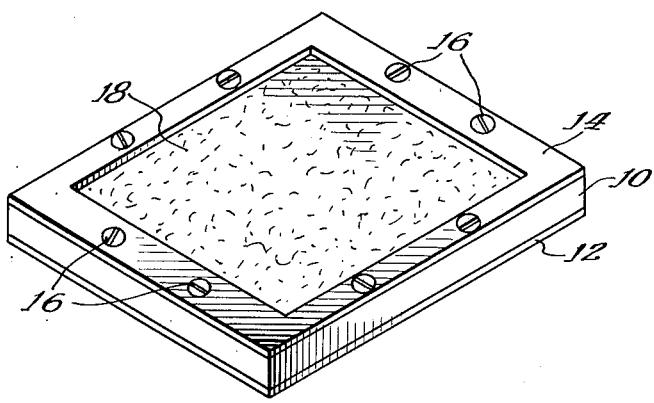
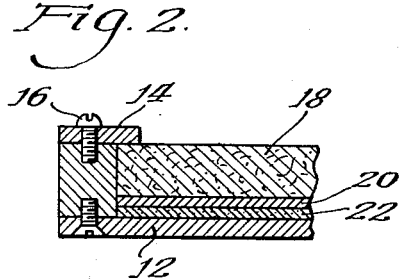
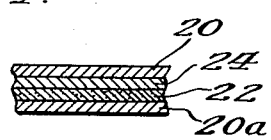
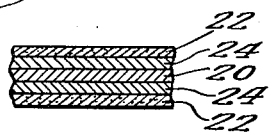
INVENTOR.
Philip Morrison
BY
Richard A. Anderson
Attorney.

Patented Feb. 13, 1951

2,541,599

UNITED STATES PATENT OFFICE 2,541,599

RADIOGRAPHY

Philip Morrison, Chicago, Ill., assignor to the United States of America as represented by the United States Atomic Energy Commission Application October 31, 1944, Serial No. 561,330

4 Claims. (Cl. 250—65)

My invention relates to the subject of radiography employing X-ray and gamma ray sources and is specifically directed to an intensifying screen and a filter used in the taking of radiographs.

The energy absorbed by the emulsion of an X-ray film exposed to the direct radiation from an X-ray tube target amounts to about 1 per cent of the incident radiation energy, while the remaining 99 per cent passes through without being transformed. A radiograph is in reality a shadow picture produced by emanating X-rays that are absorbed to various degrees depending on the thickness of the object being radiographed. Those rays not absorbed by the material being radiographed are picked up by the film, the developed density of which varies with the intensity of the rays reaching the film. Since the degree of blackening of the gradations of the radiographic densities constituting the image is dependent upon the amount of absorption of the effects of X-rays by the sensitized surface of the film, a means for more fully utilizing the radiation passing untransformed through the film, in the past, generally has been in the form of one or more intensifying screens such as, for example, of calcium tungstate, that adds its fluorescent light to the film emulsion in addition to the direct effects of the X-radiation. In other words, the intensifying screen owes its characteristic to the fluorescent property of such chemicals as calcium tungstate, that, when irradiated by X-rays, fluoresce with an intense characteristic visible radiation. Therefore, when the fluorescent compound is applied to a surface and brought in close contact with the X-ray film, the photo-chemical effect in the emulsion of the film will be increased from about 8 to 20 times that obtained without the use of the fluorescent material. By using fluorescent intensifying screens the "speed" factor of the film is considerably increased, thus requiring shorter exposure periods for radiographs.

While such fluorescent materials described above are useful for a wide variety of X-ray radiographic work, such as, for example, the radiography of aluminum parts of irregular shape, thin pieces of steel and small brass objects, such technique is not well adapted for radiographing relatively thick pieces of steel, as for example, of several inches thickness. In order to penetrate such thicknesses of dense materials, it is necessary to have a more penetrating radiation at the source such as, for example, high energy X-rays or gamma rays corresponding to an energy of a million electron volts or more. The use of such penetrating radiations considerably reduces the effectiveness of fluorescent screens since they are somewhat transparent to such radiations. In other words, penetration, or the hardness of X- or gamma radiations increases rapidly with voltage rise, and the absorption capabilities of most substances vary inversely as the potential rise to some power between 2 and 3. Stated differently, long wave length X-rays such as of 0.32 angstrom units, penetrate different materials or different thicknesses of the same material in markedly different amounts, for example, the mass absorption coefficient (i. e., fraction of energy absorbed when a beam of unit cross-section traverses a unit mass of material) of lead is 16.2 while that for aluminum is only 0.63, in other words that of lead is 26 times as great. On the other hand, for short wave length rays, such as gamma rays of 0.02 angstrom units, the mass absorption coefficient of lead is .0672 while that of aluminum is .0559 or that of lead is only 1.2 times as great. Therefore, since short wave length gamma rays penetrate various materials or various thicknesses of the same material with almost equal facility, a relatively low degree of contrast is obtained in the gamma ray photograph or gamma-graph, as it may be called.

Another difficulty encountered in the use of high energy X-rays or gamma rays for photographing thick, dense objects results from the property of such objects, like other matter, to become a source of secondary radiations and of secondary high speed electrons or beta rays when irradiated by the primary ray source. It has been found that many materials, when used as secondary radiators give rise to two distinct types of secondary radiations. One of these is known as scattered radiations, and is substantially identical with or otherwise corresponds in absorption coefficient or wave length with the primary ray. The other type is known as fluorescent radiation and is characteristic of the particular type of radiator.

The intensity of secondary radiation is usually relatively small when compared with the intensity of the primary radiation falling on the object, because only a part of the energy of the primary beam that is dissipated in the secondary radiator appears as X-rays or beta rays, and furthermore the reradiated rays spread in all directions so that their intensity in any one direction, such as towards the film, is small. However, in using high energy X-rays or gamma rays corresponding to one million electron volts or more, the effects of scattered rays are more pronounced especially with thicker radiographed objects, and have the disadvantage of imparting haziness and fogging the otherwise clear, well-defined and sharp details of the radiographic image. This fogging effect is due to the impinging of the scattered rays on the film from various directions instead of from a radiant beam projecting directly from the X-ray or gamma ray source. Scattered rays appear to be primary rays that have merely had their direction altered by the material through which they pass. Fluorescent rays, on the other hand, are characteristic of the radiator and generally do not change in character with change in wave length of the primary beam so long as this beam is of sufficiently short wave length to excite fluorescene. When X- or gamma rays traverse matter, a part of their energy is also spent ejecting beta rays or electrons from some of the atoms. The remainder of the atom is in an ionized condition and as it regains its normal state, energy is liberated which reappears as the fluorescent rays. Since all secondary radiations when emanating from the object being radiographed have the effect of reducing the definition of the photograph obtained, it has been customary in the past to provide a thin metallic filter of material of high atomic weight such as, for example, lead, immediately in front of the film so as to absorb scattered radiation and other secondary radiation and prevent its detrimental effect on the film image. A thickness of 0.01 to 0.015 centimeter of lead has been found satisfactory. Such film not only has a filtering function, but has the function of an intensifying screen as well because of its own property of emitting high speed secondary electrons when irradiated by the primary rays. These electrons, when emitted close to the emulsion, affect the emulsion. The use of lead screens tends to reduce the secondary radiation emanated from the object being radiographed and to intensify the radiograph by emission of high speed electrons.

One outstanding disadvantage of the use of filters, such as lead, has been the necessity for increase in the exposure time because of the effect of the filter of slowing the speed of the film. Exposure times of several hours or a day are common with the use of lead filters. Even with such increase in exposure time, the use of lead as filters is advantageous since it increases the exposure time to a period that is only one-half of that required by the use of the well-known Bucky grids for eliminating scattered radiations. Furthermore, such thin lead filters have the additional advantage over Bucky grids in that they occupy negligible space in film holders and there are no moving parts and no moving power requirements such as is necessary in a Bucky grid. Despite this advantage over the Bucky grid with higher energy X- and gamma rays, the necessary increase of exposure time by use of a metal filter as an intensifying screen even though having small thickness, has the outstanding disadvantage of requiring too long an exposure period. Furthermore, good definition has been exceedingly difficult to obtain under such circumstances, because a certain amount of scattering of secondary high speed electrons ejected from the filter by the primary ray will occur even through thin metal shields. Furthermore, for cases involving a high degree of scattering by the object, lead filters must be increased in thickness to perhaps as much as ¼ of an inch or ½ of an inch to absorb the scattered radiations and in so doing, the definition of the radiograph is impaired.

An object of my invention is to provide an improved intensifying screen and filter for use in X- and gamma ray radiography.

Another object of my invention is to provide an efficient filter at the X- or gamma ray source to reduce its intensity when desired, such as in radiographing relatively thin objects or objects of low density.

Another object of my invention is to provide a filter and intensifying screen useful in photographing relatively thick dense objects by high energy X- or gamma rays and that is of sufficient thickness to give more intensification and more definition than metal screens used heretofore.

Other objects and advantages will become more apparent from the following description and the accompanying drawing in which:

Figure 1 is an isometric view of a cassette containing the X-ray filter of the invention;

Figure 2 is a fragmentary view in cross section of the cassette of Figure 1 illustrating one embodiment of the invention;

Figure 3 is a fragmentary cross sectional view of an alternative film and filter assembly corresponding to the film and filter assembly of Figure 1;

Figure 4 is a cross sectional view of still another film and filter assembly; and Figure 5 is a cross sectional view of yet another film and filter assembly.

In the drawing Figure 1 shows a typical cassette or container for X-ray films comprising an aluminum frame 10, base plate 12 and cover frame 14 secured by screws 16. As shown in Figure 2, the film and filter assembly rests on the base plate 12 and is covered by a light-insulating packing 18 of felt or similar material. It will be understood that the cassette and packing illustrated in Figures 1 and 2 constitute no part of the present invention. It will be further understood that the cassette and packing are accordingly not illustrated in Figures 3, 4 and 5 in order to simplify the illustration of the invention.

In accordance with one aspect of my invention shown in Figure 2, I provide a sheet or foil of uranium metal 20 parallel to and immediately adjacent the sensitized surface of a film 22, that is, between the film and object being radiographed by high energy X-rays or gamma rays. The purpose of the uranium foil is two-fold: (1) to absorb secondary radiations, such as scattered rays, caused by the object being photographed or other adjacent parts, such as the table, etc., thus preventing such scattered rays from imparting haziness and loss of definition to the radiograph image and (2) to intensify the photo chemical effect of the film emulsion by virtue of the property of uranium foil to give off secondary high speed electrons when irradiated by X-rays. The secondary high speed electrons are believed to ionize the emulsion grains of the film to cause blackening.

This uranium filter has been found to be superior to lead filters previously used since the loss of definition caused by a lead foil is reduced by 50 per cent or more by the use of the uranium filter. In accordance with a further modification of this invention illustrated in Figure 3, I have been able to improve the function of this new uranium filter and thereby to improve the character of photographs secured by providing adjacent the uranium filter or intensifying screen 20, a thin or foil-like filter of a material that has a high absorption coefficient for alpha rays, for example, a thin foil 24 of aluminum or of lead or even of paper thin enough to transmit the secondary electrons originating in the uranium but capable of absorbing substantially all alpha rays produced from the filter. Aluminum alloy sheets may be cemented on the uranium foils for this purpose. Such a foil 24, of course, is interposed between the uranium foil 20 and the film 22.

The uranium metal foil should be sufficiently thin so as to be readily transparent to the primary rays, but sufficiently thick as to absorb most of the secondary rays or soft rays of long wave length. Foils of a thickness commonly used with other metallic filters used in this field are generally suitable. Generally speaking, the thinner the filter, the smaller the scattering of the secondary electrons therethrough and the better the definition of the radiograph. It is highly desirable to arrange the above-mentioned foils and film in a cassette of any well-known type, such as, for example, one having an aluminum casing, so that the various foils may have a suitably rigid backing or reinforcement and that sufficient pressure may be exerted on the various foils to produce intimate contact therebetween to reduce scattering of the primary ray or secondary electrons by the uranium filter or by the alpha absorbing foil and thus increase the definition of the radiograph obtained on the film. The object being radiographed may be supported by or placed immediately adjacent the cassette.

In accordance with a further modification of the invention, coatings or films capable of absorbing alpha rays may be used in lieu of preformed sheets or foils 24. For example, the uranium filter may be coated with an absorber such as red lead. Moreover, for radiographs requiring a relatively short exposure period the alpha absorbing foil or coating may be omitted as shown in Figure 2 so long as the uranium is kept away from the film until the time of taking the radiograph.

In accordance with a further modification shown in Figure 5 the uranium filter 20 preferably coated with an alpha ray absorbing material 24 on both sides thereof may be sandwiched between two films 22 in order to take two radiographs simultaneously which may be superimposed to give a clearer radiograph.

I have found that a thin film or foil of uranium has substantially the same absorption properties for scattered radiation, and image intensifying properties, as a foil of lead having over twice the thickness. More specifically, a thickness of .45 centimeter of uranium is equivalent to a thickness of 1 centimeter of lead. Therefore, since a thinner film of uranium is used, less scattering of the secondary electrons therethrough results, and a much better definition of the radiograph is obtained. It can be shown that a foil of uranium metal produces over twice as good definition as that resulting from a lead foil of the thickness needed to secure the same intensification.

Another outstanding advantage in using metal filters of uranium is that it eliminates the necessity of masking small objects that do not cover the entire film. The metal filter acts as a strong absorber of the intense radiation or halo around the subject, therefore reduces the amount of overexposure in this region. Overexposure of the film at the edge of the image produces serious halations in the image as the result of secondary radiations from the cassette, film, etc.

While I have described the use of uranium foil between the film and object being X-rayed, it should be noted that by also applying a backing of uranium foil to the film by the use of a second uranium filter 20a as shown in Figure 4, it is possible to permit the passage of primary radiation to the film 22 but to prevent the return through the second filter 20a of scattered and secondary radiation originating in sources beyond the second filter, or from the surface opposite from the source of the primary rays. In this case, the front screen 20 is more effective in intensifying the image than the back screen 20a. By making the back screen thick, it will absorb radiation scattered from matter behind the film to avoid fogging of the film or radiograph as well as some of the primary radiation and will give a shorter exposure time. Such back screens may be permanently fastened to well-known types of cassettes. Furthermore, either or both of such uranium sheets may be mounted on a suitable reinforcing base such as cardboard or paper sheets for strength and to facilitate handling.

Another use of a thin sheet of uranium is that of a filter immediately adjacent the X- or gamma ray source to reduce its intensity in cases where the object radiographed is too thin or not dense enough to get optimum definition or contrast in the radiograph.

Thus I have provided a uranium filter and intensifying screen for use in radiography that has the effect of greater intensification, better removal of a substantial portion of secondary radiation, increase in film contrast, and substantial improvement in definition in the radiography obtained. Furthermore, while uranium foils have been described herein as being substituted for the well-known intensifying screens of fluorescent materials, such as calcium tungstate, it should be noted that they may be used together with such fluorescent screens, if desired. In other words, if shorter exposure periods are desired, the fluorescent screens may be interposed between the film and uranium foil, and if two uranium foils are used, that is, one in front and the other behind the film, two fluorescent screens may be used, each sandwiched between the film and uranium foil. The aluminum foils 24 may thus be replaced by such fluorescent screens. Furthermore, it is possible, if desired, to coat one or both surfaces of the uranium filter with fluorescent material as calcium tungstate, even mixed with red lead to obtain greater intensification and shorter exposure period.

It should be noted that others, after having had the benefit of the teachings of my invention, may be readily apprised of other equivalent structures, hence the invention should not be restricted except insofar as set forth in the following claims.

I claim:

1. In combination, a source of high energy X- or gamma rays, a photographic surface, and a filter of uranium metal intermediate said source and photographic surface and immediately adjacent to said photographic surface.

2. In combination, a source of high energy X- or gamma rays, a photographic surface, and a thin sheet of uranium metal intermediate said source and photographic surface and immediately adjacent said photographic surface.

3. In combination, the elements of claim 2 and a second sheet of uranium metal immediately adjacent to the opposite side of said photographic surface from said first uranium sheet, 4. In combination, the elements of claim 2 and a second radiographic film disposed intermediate the sheet of uranium metal and the source and immediately adjacent to said uranium metal sheet.

PHILIP MORRISON.

REFERENCES CITED

The following references are of record in the file of this patent:

UNITED STATES PATENTS

| Number | Name | Date |
|---|---|---|
| 595,812 | Kinraide | Dec. 21, 1897 |
| 1,626,306 | St. John | Apr. 26, 1927 |
| 1,933,652 | Boldingh | Nov. 7, 1933 |
| 2,120,908 | Raney | June 14, 1938 |
| 2,216,326 | Smith | Oct. 1, 1940 |
| 2,344,042 | Kallmann et al. | Mar. 14, 1944 |

FOREIGN PATENTS

| Number | Country | Date |
|---|---|---|
| 20,100 | Great Britain | Nov. 23, 1905 |
| 251,477 | Great Britain | May 6, 1926 |